Sept. 18, 1951  T. R. WILKINSON  2,568,046
SHELF FOR VEHICLE BODIES
Filed Sept. 15, 1949  2 Sheets-Sheet 1
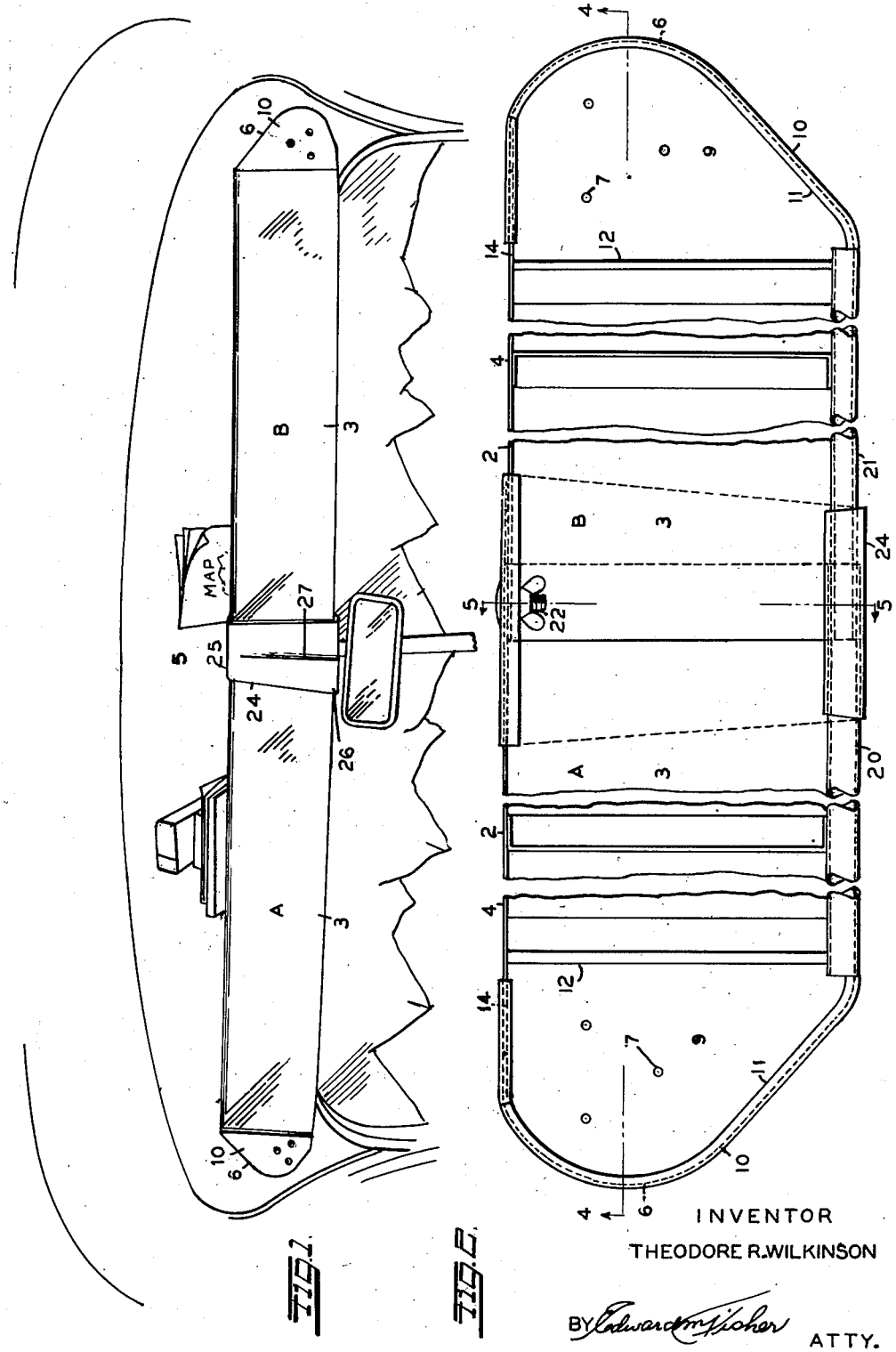
INVENTOR
THEODORE R. WILKINSON
BY Edward M Fisher ATTY.

Sept. 18, 1951 — T. R. WILKINSON — 2,568,046
SHELF FOR VEHICLE BODIES
Filed Sept. 15, 1949 — 2 Sheets-Sheet 2
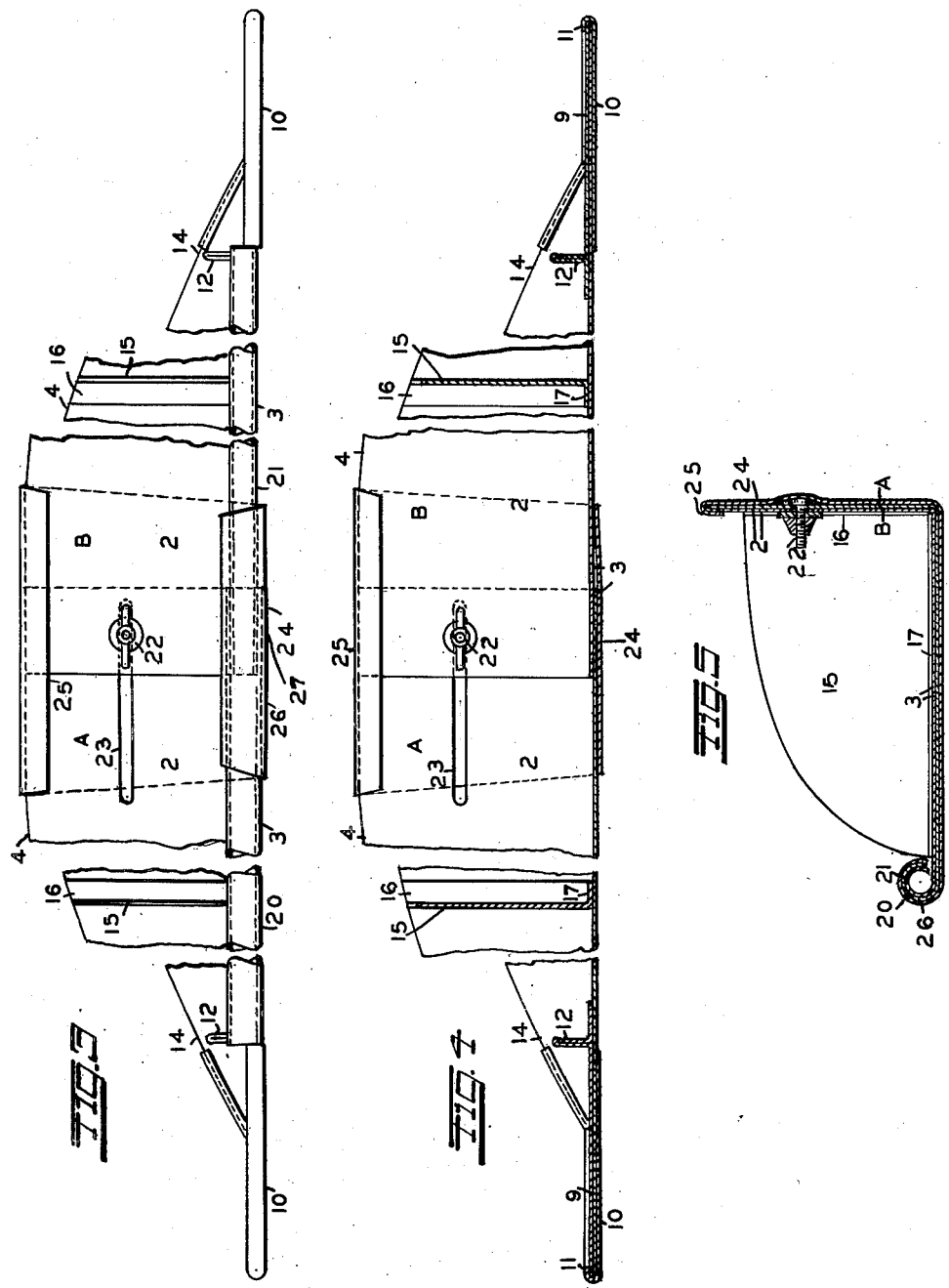
INVENTOR
THEODORE R. WILKINSON
BY Edward M. Fisher ATTY.

Patented Sept. 18, 1951

2,568,046

UNITED STATES PATENT OFFICE 2,568,046

SHELF FOR VEHICLE BODIES

Theodore R. Wilkinson, St. Petersburg, Fla., assignor, by direct and mesne assignments, to Wilkinson-Gresh, Inc., St. Petersburg, Fla., a corporation of Florida Application September 15, 1949, Serial No. 115,799

7 Claims. (Cl. 224—42.45)

This invention is concerned with the provision of a shelf for a vehicle body including the conventional outwardly bowed wall or ceiling constituting a connection between the roof and front of the body above the windshield thereof.

Broadly it is an object of this invention to provide a shelf for a vehicle body which is adapted for fitting to a conventional bowed vehicle wall or ceiling and primarily directly above the windshield thereof. The shelf may be composed of a single piece of material or may comprise extensible telescopic sections, each formed with angularly disposed members, one of which constitutes a base, the outer edge being bowed corresponding to the vehicle bowed wall for contact matching therebetween, the other a flange having continuations beyond the opposite ends of the base to form fastening extremities for tacking to said wall in mounting the sections thereto.

Other and further objects will appear as the description proceeds.

This invention resides substantially in the combination, construction, arrangement and relative location of parts, all in accordance with the disclosure herein.

In the accompanying drawings,

Figure 1 is a perspective view illustrating that portion of a vehicle bowed wall or ceiling directly above a windshield and a shelf embodying this invention fitted thereto.

Figure 2 is a plan view on a larger scale, of this invention.

Figure 3 is a side elevation thereof.

Figure 4 a section on line 4—4, Figure 2.

Figure 5 a section on line 5—5, Figure 2.

The true nature and manner of use of a shelf in accordance with this invention will be best understood by a detailed description of the form thereof shown in the drawings in an illustrative sense.

Now referring more particularly to the drawings it will be observed that the shelf embodying this invention is comprised of two telescopic sections A and B, each of which is formed of a single piece of metal to provide angularly disposed members one of which constitutes a base 2 and the other a flange 3 perpendicular thereto, the base having at its edge a bowed portion 4 corresponding to the bowed wall 5 of a normal conventional vehicle for contact matching therebetween, the flange portion having longitudinal continuations 6 beyond opposite ends of the base to form fastening extremities for tacking to the said wall 5 in mounting sections thereto.

Said tacking is accomplished by means of screws, or the like, inserted thru apertures 7 and screwed into wall 5, or if the vehicle is equipped with conventional inside sun vizors of the type supported in a socket or bracket screwed to the wall 5, said socket or like members are removed, the shelf fitted in place with apertures 7 aligned with socket screw wall openings and the sockets replaced, and fastened to the wall.

Reinforcement for the outer continuation of each flange is established thru plates 9 and 10, outer edges of the plate 9 being curved in accordance with the curve of the flange end and aligned thereto, outer edge of plates 10 being bent over and formed to plate 9 as at 11, inner portion of plates 9 having overlapped angular rib portions 12 forming a support for tip ends 14 of base member 2, said plates 9 and 10 being fixedly engaged upon flange member 3 by welding, soldering, riveting, or other suitable means. Further reinforcement of base 2 is thru partition members 15 with flange portions 16 and 17 positioned substantially midway, longitudinally, of each section, and fixedly engaged with the base 2 and flange 3 thru said flanges 15 and 16, respectively, by welding, soldering, riveting, or other suitable means.

The longitudinal edge of flange 3 of section A is inwardly and downwardly bent to form a guideway 20 adapted to receive a corresponding guideway 21 of the other mating section B for telescopically connecting such sections and when telescoped to a pre-determined over-all length the overlapping base members are bolted together as at 22, however to provide longitudinal movement of said sections for adjusting and fitting of the shelf to bowed wall 5 without interference by said bolt, base 2 of section A is slotted as at 23.

As a reinforcing means for the sections A and B in the area of their telescopic joint a band member 24 is provided said band being angularly formed corresponding to said sections and having bent over edges 25 and 26 formed for slidable fit to and over the overlapped edges of the base members and the jointure of the telescoped sections, respectively, said band being creased as at 27 to urge its outer surfaces inward to the contacted section faces.

It is a known fact, especially to those acquainted with the art, that aside from the wall 5 being bowed horizontally it is also curved vertically that is curved upward and inwardly from the top of the windshield, therefore, in installing this shelf same is placed at an angle depending on said vertical curvature of wall 5 for mating the flange fastening continuations thereto.

While preferred specific embodiments of the invention are hereinbefore set forth, it is to be understood that I am not to be limited to the exact structure illustrated and described, as various modifications of these details may be provided in putting the invention into practice, within the purview of the appended claims.

What is claimed:

1. A shelf for a vehicle body provided with an outwardly bowed wall constituting a connection between the roof and front of the body, comprising extensible telescopic sections, each formed of a single piece of metal to provide angularly disposed members, one member of which constitutes a base and the other member a flange perpendicular thereto, the base having at its edge a bowed portion corresponding to the bowed wall for contact matching therebetween, and longitudinal continuations of said flange beyond opposite ends of the base to form fastening extremities for tacking to the said wall in mounting the sections thereto.

2. A shelf for a vehicle body provided with an outwardly bowed wall constituting a connection between the roof and front of the body, comprising, extensible telescopic sections, each formed of a single piece of metal to provide angularly disposed members, one member of which constitutes a base and the other member a flange perpendicular thereto, the base having at its edge a bowed portion corresponding to the bowed wall for contact matching therebetween, longitudinal continuations of said flange beyond opposite ends of the base to form fastening extremities for tacking to the said wall in mounting the sections thereto, and partitioning walls built from the flange at points inwardly removed from the fastening extremities.

3. A shelf for a vehicle body provided with an outwardly bowed wall constituting a connection between the roof and front of the body, comprising, extensible telescopic sections, each formed from a single piece of metal to provide angularly disposed members, one member of which constitutes a base and the other member a flange perpendicular thereto, the base having at its edge a bowed portion corresponding to the bowed wall for contact matching therebetween, continuations of said flange beyond opposite ends of the base to form fastening extremities for tacking to the said wall in mounting the sections thereto, and partitioning walls built from the flange at points inwardly removed from the fastening extremities, the longitudinal edge of the flange of one section being inwardly and downwardly bent to form a guideway adapted to receive a corresponding guideway of the other mating section for telescopically connecting such sections.

4. A shelf for a vehicle body provided with an outwardly bowed wall constituting a connection between the roof and front of the body, comprising a piece of metal formed to provide angularly disposed members, one member of which constitutes a base and the other member a flange perpendicular thereto, the base having at its edge bowed portions corresponding to the bowed wall for contact matching therebetween, and longitudinal continuations of said flange beyond opposite ends of the base to form fastening extremities for tacking to said wall in mounting the shelf thereto.

5. A shelf for a vehicle body provided with an outwardly bowed wall constituting a connection between the roof and front of the body, comprising a piece of metal formed to provide angularly disposed members, one member of which constitutes a base and the other member a flange perpendicular thereto, the base having at its edge bowed portions corresponding to the bowed wall for contact matching therebetween, and longitudinal continuations of said flange beyond opposite ends of the base to form fastening extremities for tacking to said wall in mounting the shelf thereto, said flange fastening extremities being curved on their end edges for contact matching with the bowed wall.

6. A shelf for a vehicle body provided with an outwardly bowed wall constituting a connection between the roof and front of the body, comprising a piece of metal formed to provide angularly disposed members, one member of which constitutes a base and the other member a flange, the base having at its edge bowed means corresponding to the bowed wall for contact matching therebetween, and flange means adjacent the opposite ends of the base forming fastening extremities for attaching said shelf to the said wall.

7. A shelf for a vehicle body provided with a wall constituting a connection between the roof and front of the body, comprising a base portion having an angular flange connected thereto, the base having at its edge bowed means corresponding to the bowed wall for contact matching therebetween, and flange means adjacent the opposite ends of the base forming fastening extremities for attaching said shelf to the said wall.

THEODORE R. WILKINSON.

REFERENCES CITED

The following references are of record in the file of this patent:

UNITED STATES PATENTS

| Number | Name | Date |
| --- | --- | --- |
| 729,078 | Maxwell | May 26, 1903 |
| 906,809 | Lillibridge | Dec. 15, 1908 |
| 1,043,950 | Martin | Nov. 12, 1912 |
| 1,305,756 | Tone et al. | June 3, 1919 |
| 1,851,965 | Bartholomae et al. | Apr. 5, 1932 |
| 1,904,114 | Ambrosius | Apr. 18, 1933 |
| 2,201,114 | Peltier et al. | May 14, 1940 |
| 2,216,621 | Macinga | Oct. 1, 1940 |
| 2,494,980 | Zuckerman | Jan. 17, 1950 |